Jan. 9, 1934.  A. E. GLANCY  1,942,400
OPHTHALMIC LENS
Filed Aug. 23, 1929  3 Sheets-Sheet 1
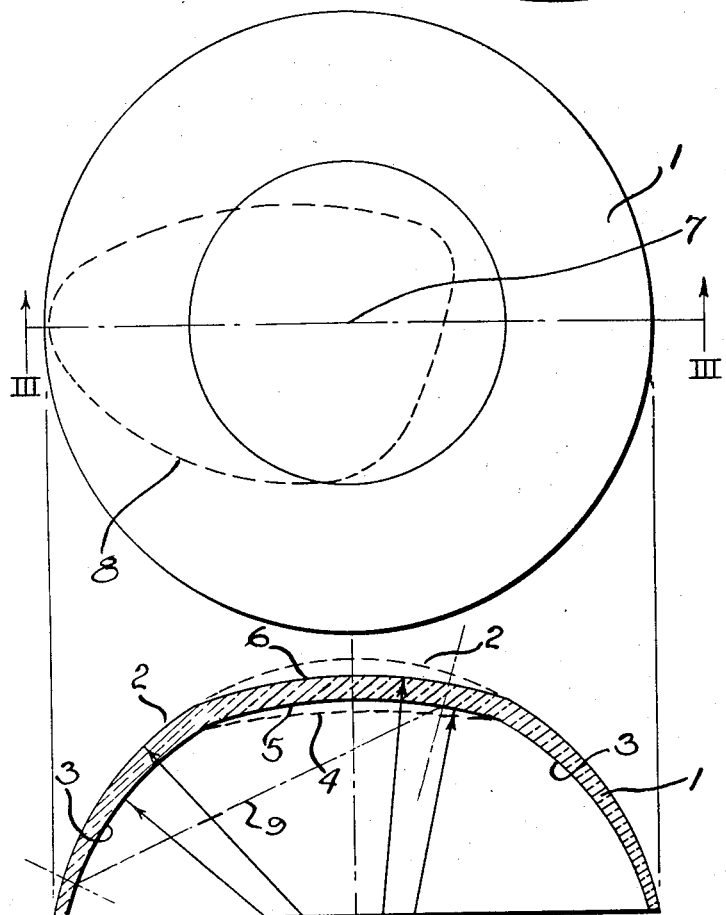
Fig. I.
Fig. II.
Fig. III.
INVENTOR
ANNA E. GLANCY
BY Harry H. Styll
ATTORNEY Jan. 9, 1934.  A. E. GLANCY  1,942,400
OPHTHALMIC LENS
Filed Aug. 23, 1929   3 Sheets-Sheet 2
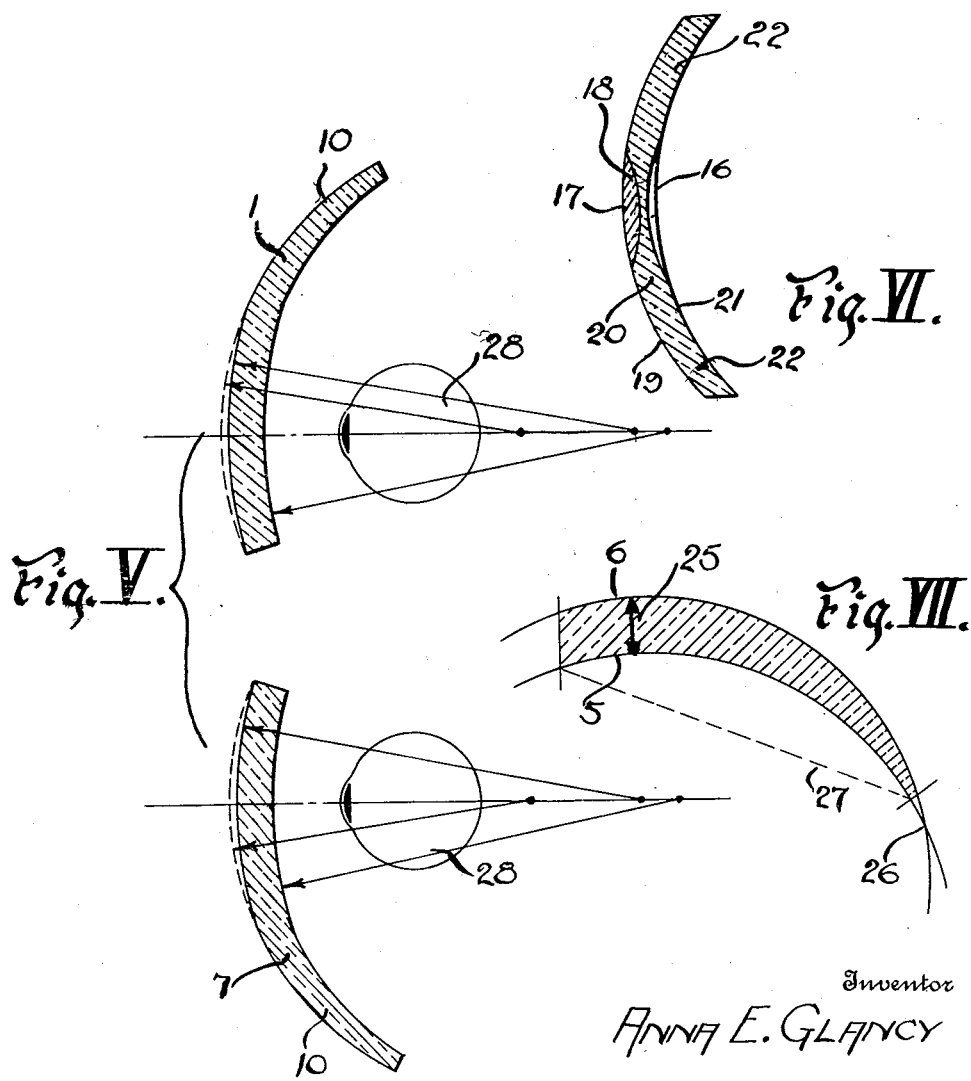
Inventor
ANNA E. GLANCY
By Harry H. Styll
Attorney Jan. 9, 1934.  A. E. GLANCY  1,942,400
OPHTHALMIC LENS
Filed Aug. 23, 1929   3 Sheets-Sheet 3
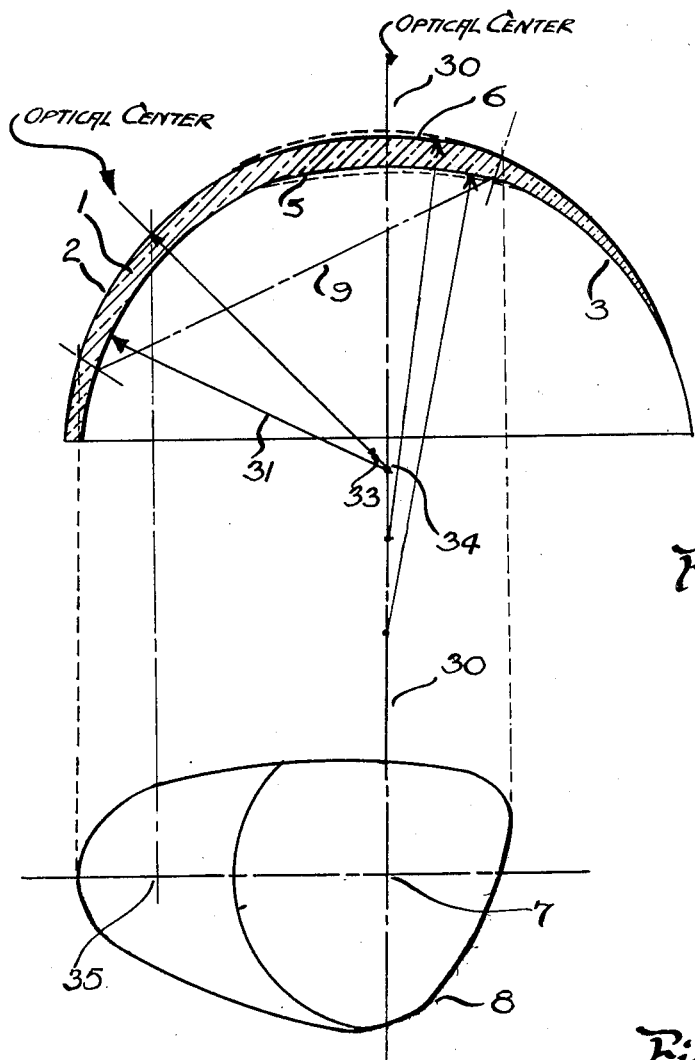
Fig. VIII.
Fig. IX.
Inventor
ANNA E. GLANCY
By Harry H. Styll
Attorney Patented Jan. 9, 1934

1,942,400

UNITED STATES PATENT OFFICE 1,942,400

OPHTHALMIC LENS

Anna E. Glancy, Southbridge, Mass., assignor to American Optical Company, Southbridge, Mass., a voluntary association of Massachusetts Application August 23, 1929. Serial No. 387,913

8 Claims. (Cl. 88—54)

This invention relates to improvements in ophthalmic lenses and has particular reference to a lens having a portion carrying the prescriptive power correction of the wearer and another supporting portion suitable for clear vision and more particularly for use in goggles and eye protectors requiring large size lenses embodying both the features of eye protection and eye correction and in heavy lenses requiring a reduction in weight such as lenticular and cataract lenses etc., and to an improved process for making the same.

A principal object of this invention is to provide an improved ophthalmic lens having prescriptive power correction within the field of a supporting portion suitable for clear vision, thereby reducing the weight of the lens.

Another object of this invention is to provide a lens conforming closely to the contour of the face, such as an automobile or aviation goggle lens, wherein prescription values may be incorporated with ease.

Another object is to provide in a steep curve lens the desired prescription values with very little prismatic displacement.

Another object of the invention is to provide means to incorporate in the large size steep curve lenses necessary for automobile and aviator's goggles, the prescription values hitherto impossible to construct, because of the physical impossibility of placing curves on such large size lenses.

Another object is to provide improved means to make such a lens in any well-known form including the one-piece, fused or cemented types.

Another object of the invention is to provide an improved process for making a lens having a large protective field of zero or other power combined with a prescriptive power portion occupying the useful field of vision together with the product of said process.

Another object of the invention is to provide an improved lens blank which may be made by the manufacturer and sold to the prescription dealer whereby the prescription dealer may make a lens of this nature by simply placing the prescription curve on one side of the blank so that lenses of this nature may be dispensed in the same manner that ordinary lenses are dispensed today, that is to say, the manufacturer making the blank and the prescription dealer putting on the one prescription surface thus making the dispensing of these lenses as facile as that for ordinary lenses, and increasing the speed and ease of service to the wearer.

Other objects and advantages will become apparent from the following description taken in connection with the accompanying drawings and it will be apparent that many changes may be made in the details of construction and arrangement of parts and steps of the process without departing from the spirit of the invention as expressed in the accompanying claims. I, therefore, do not wish to be limited to the exact details shown and described as the preferred forms only have been shown by way of illustration.

Fig. I is a front view of a lens embodying the invention.

Fig. II is a front or plan view of one form of lens in the process of manufacture.

Fig. III is a section on line III—III of Fig. II.

Fig. IV is a sectional view similar to Fig. III showing the invention applied to a shallow curve lens.

Fig. V is a diagrammatic view illustrating the features of the invention.

Fig. VI is a sectional view showing a modified form of the invention.

Fig. VII shows a lens having prescription curves over the entire area of the lens.

Fig. VIII is a sectional view similar to Fig. III showing a modification of the invention.

Fig. IX is a top or plan view of the modified lens of Fig. VIII.

This invention is particularly applicable to lenses having prescription curves and to lenses shaped to steep curves upon which it is desired to place a prescriptive correction.

For lenses used in cataract cases or any strong power prescription uses, a much lighter lens can be provided than has hitherto been possible. It will be obvious that the usual type of strong power lens was of thick and heavy proportions in order to carry the necessary steep curves. In my invention I have provided means to eliminate much of the weight formerly unavoidable as will be apparent from the following description.

In the second application of the invention, namely to lenses shaped with steep curves such as are used on aviators' goggles to conform closely to the facial contour, my invention makes possible the use of prescription values otherwise quite impossible to form thereon. The invention also reduces to negligible proportions the amount of prismatic disturbance at the sharply curved temporal ends of such goggle lenses as will later be set forth.

Referring to the drawings wherein similar reference characters denote corresponding parts throughout the several views I have shown in Figs. II and III the production of my improved lens. I first shape by moulding or other suitable method, an optical glass blank 1 of preferably circular and disk or meniscus-shaped formation. The convex side of the blank may have a continuous curve 2 over the whole surface, a portion of this curve being shown in dotted lines in Fig. III at the center portion of the blank I. The concave curve 3 is formed with a segmental field at the center portion shown by dotted line 4 which is flatter in curvature than the rest of the concave curve 3. I preferably form the curves 2 and 3 of similar radius and from the same center line and it will necessarily follow that the power through the field surrounding the segment is substantially zero although it may be made of other powers if desired.

The center portion will, of course, add power to the lens and I may keep this for my spherical or other curves in various prescriptions.

I next use the usual prior art ring tool grinding process over the portion 4 and form, for the purposes of this description, a spherical curve to the line 5 meanwhile finishing the molded curve over the rest of this concave surface 3 to an optical surface.

Where the desired correction incorporates cylinder power I can form my required toric or cylinder surface in the outer curve 2 using the regular prior art methods for toric or cylinder curves as the case may be, which will thereby be reduced to the point shown by line 6 in Fig. III, it being understood that a toric curve is one which has a different curvature in its two principal meridians.

It will now be apparent that I have a prescription lens bounded by the curves 5 and 6 surrounded by lens media of practically zero power bounded by the curves 2 and 3.

I now cut the disc 1 to any shape desired and at the same time place the optical center 7 also wherever I desire. In this connection the dotted line 8, Fig. II shows a typical aviator's goggle lens outline which can be cut from the disc 1.

The line 9, Fig. III shows the length from edge to edge along the length of the lens so cut. As shown in Fig. I the lens will be partly of zero power at 10 having the prescription power segment 11 at the nasal side.

In the foregoing example illustrated in Fig. III I have shown the centers of curvature of the four curves over the prescription and other portion as located directly upon the center line 29 of the prescription curves, this being also the geometrical center line. It will be obvious that if desired the optical center of the temporal or substantially zero field can be placed where the best advantages can be obtained. For example, to lessen prismatic displacement in this field of substantially plano power, I can place the optical center in the center of said field, thereby having an optical center for each of the two fields of my improved lens and both lying at a desired position in their respective fields. This placing of the optical centers where desired may be accomplished with great facility and in Figs. VIII and IX I have illustrated the features of this type.

In the production of this form I first mould the blank 1 to a similar shape as for the first type. The concave surface 3 may next have similar curves 3 and 5 placed upon it as in the first type as this surface is not being changed for the purposes of this description.

The centers for these curves are preferably both on the axial line 30 of the prescription portion. I next prepare to grind the molded surface of the convex side 2 by the usual prior art methods and preferably first form the curve to fix the optical center of the substantially plano field. This curve is designated in Fig. VIII by the radius line 31 and is of a radius nearly equal to that to be placed on the rest of the lens media surrounding the segment in the convex side. This is necessary in order that the plano power may be maintained. The optical center 35 of the temporal field may be located as desired. The center of curvature of the surface 3 is at 34 on the axial line 30, the optical center 35 therefore will be on a line passing through the center 34 and the center 33 of the curve 2; therefore simply by changing the position of the center 33 the optical center 35 may be located as desired.

The prescription curve 6 may be finished upon the convex side and the lens cut as shown by line 8, Fig. IX.

It will be apparent that by selecting the base curves, as is well known in the prior art, I can design my prescription portion to give minimum oblique aberration and at the same time reduce to negligible proportions the prismatic displacement of the other field.

This lens will have all the necessary field of correction without any of the drawbacks of the prior art. In this connection it will be apparent that if the correction were to be placed over the entire area of the lens as was the usual practice, as shown in Fig. VII, it would often be impossible to make certain powers of lenses inasmuch as the steep curves necessary on the opposite faces 5 and 6 would frequently meet at the temporal end 26 even if the lens was made exceedingly thick at one end as at 25 so that it is impossible to produce the full outline shape required.

A usual requirement of usable aviators' lenses is that they be at least 78 millimeters in length from edge to edge with the optical center of the lens approximately 17 millimeters from the nasal edge. The lens is shaped to fit the contour of the face and to extend rearwardly of the outer canthus of the eye.

In Fig. VII, I have shown the results obtained in trying to develop a plus 1.50 diopter lens to the above mentioned requirements, with a maximum usable thickness of 10 millimeters at the point 25. The two curves 5 and 6 intersect at point 26 limiting the maximum obtainable length along the line 27 to 72 MM, 6 MM below the required length.

Computation shows that increasing the thickness to 20 millimeters will not give sufficient length for some of the more modern and larger aviators' goggles. It is obvious that if the required length could be obtained the lens would be too thick, unwieldly and cumbersome for use. This particular power lens was selected for illustration because it is one of the usual weak corrections required. Another serious defect in this type of lens is the increased prismatic displacement at the temporal side of the lens, as for example an aeroplane located at the aviator's side or back would not appear where it really is but instead would appear displaced by many degrees leading to false maneuvering and accidents.

In my invention there is obviously no restriction of this nature and very little prism as I limit my corrected field to any diameter suitable for the type of lens to be made.

By referring to Fig. V it will be clearly seen that the goggle lenses 1 before the eyes 28 have a full field of correction and also the protection given by the extra portion 10 fitting around the face. The lens thus formed is very suitable for fitting to the usual type of frame as the variation in the thickness of each end is very slight and the weight of the whole lens is greatly reduced over that of the prior art.

I have confined the foregoing description to a cylinder lens having the spherical curve on the inside and the toric or cylinder curve on the outside face, but it will be apparent that a spherical curve could be placed on both sides if desired. I could also make my lens with the toric curve on the inside as shown in Fig. IV. I can place on the thickened part of the dish blank spherical curves on both sides, or toric or cylindrical curves on both sides, or I can place a spherical curve on one side and a toric or cylindrical curve on the other. In this view numeral 12 designates the toric curve which is steeper than the surrounding spherical curve 13. The outer face 14 may also have a spherical curve 15 for power forming a segment on this face. The two prescription curves 12 and 15 may be of about the same diameter to give a better appearing lens if desired.

A lens having a correction for astigmatism throughout its area may be obtained by placing the toric curve 12, as in Fig. IV, over the entire inner surface of the lens instead of restricting it to a small area, that is, the toric curve would extend over both surfaces 12 and 13. The outer surface 14 and 15 would be finished with the usual spherical curves to give the required power and astigmatic correction.

It will also be apparent that while this description has been confined to a one-piece lens, a composite lens could be made with equal facility. As shown in Fig. VI the toric curve can be formed at 16 which is on the inside and the button 17 may be inserted on the outer curve and give the spherical power while the portion 22 is of practically zero power as set forth for the one-piece lenses.

The process of making the type shown in Fig. VI is to first form the countersink 18 in the outer face 19 of the blank 20 and insert the button 17 by fusing, cementing or other suitable methods usual in the prior art.

The outer and inner faces 19 and 21 are then surfaced with spherical curves which are so related that portion 22 will be approximately zero in power. The inner face 21 is then formed with a toric curved countersink 16 for the cylinder correction or to obtain the power or corrective value desired in the button portion of the lens. The curve on the face 19 can be finished completely over the outer surface including the inserted portion 17. The positions of the button 17 and the toric curve 16 can be reversed if desired.

The shaped lens is then cut from the blank the same as in the previously described lens.

The prescription portion of any of the above described lenses may be marginally corrected for astigmatism and focal error by proper selection and relationship of the two curves on the opposite sides of the lens, as is done in prior art lenses.

Another important advantage of my invention lies in the fact that these lenses may be manufactured in quantity and shipped to the dealer for finishing to customers' prescriptions in the same way that ordinary spectacle and eyeglass lenses are made and shipped. In this way the blank is finished by the manufacturer in his routine production except for the prescription curve on one face. The dealer merely has to select a suitable blank as regards the base curve and place thereon the customer's correction. This system ensures a great saving in the cost of manufacture as will readily be apparent when the obvious superiority of standardized factory production over the individual manufacturing methods of small prescription shops is taken into consideration.

From the foregoing description it will be seen that I have provided a new and novel lens wherein a prescription curve may be formed on a lens having a large area shaped to fit the contour of the face and extend rearwardly of the outer canthus of the eye, and to an improved process for making the same wherein the lens will be relatively light in weight and substantially free from prismatic displacements.

Having described my invention I claim:

1. A multifocal lens having a focal field of one power on the temporal side of the lens and a focal field of another power on the nasal side of the lens with the optical center of the temporal field located between the geometrical center of the lens and the temporal edge and with the optical center of the nasal field located between the geometrical center of the lens and the nasal edge thereof.

2. A multifocal lens having two focal fields of different power separated one from the other on substantially a vertical meridian of the lens, the temporal field having an optical center located between the geometrical center of the lens and the temporal edge and the nasal field having a distance power and an optical center located between the geometrical center of the lens and the nasal edge thereof.

3. A multifocal lens having two focal fields of different power separated one from the other on substantially a vertical meridian of the lens the temporal field having an optical center located between the geometrical center of the lens and the temporal edge and the nasal field having a difference in power in its two major meridians, and an optical center located between the geometrical center of the lens and the nasal edge thereof.

4. An ophthalmic lens comprising an optical field on the temporal side thereof of substantially zero power, the surfaces on the opposite sides of said field being divergent and the said field having an optical center, and an optical field for distance vision on the nasal side thereof, the said field having an optical center lying between the geometrical center of the lens and the nasal edge thereof, and the optical center of the first field lying between the geometrical center of the lens and the temporal edge thereof.

5. An ophthalmic lens of a single integral piece of glass comprising an optical field on the temporal side thereof of substantially zero power, the surfaces on the opposite sides of said field being divergent and the said field having an optical center, and an optical field for distance vision on the nasal side thereof, the said field having an optical center lying between the geometrical center of the lens and the nasal edge thereof, and the optical center of the first field lying between the geometrical center of the lens and the temporal edge thereof.

6. A blank for an ophthalmic lens comprising a bowl shaped member of glass, said member having on its outer surface an outer annular zone finished to a curved optical surface and a central axial portion surrounded by said zone, said central portion being finished to a curved optical surface and having a flatter curvature than the surrounding zone and lying within the line of extension of the curvature of the outer zone and said member having on its inner surface an outer annular zone finished to a curved optical surface and the optical power through said outer zone portion being substantially zero, and a central axial portion on the inner side surrounded by said zone, said central portion being also a finished curved optical surface of flatter curvature than the outer zone surrounding it, said central portion having an optical power and the axis of said bowl member passing through the center of said central portions.

7. A blank for an ophthalmic lens comprising a bowl shaped member of glass, said member having on its outer surface an outer annular zone finished to an optical surface and a central axial portion surrounded by said zone, said central portion being finished to an optical surface of different curvature than the surrounding zone, and said member having on its inner surface an outer annular zone finished to an optical surface and a central axial portion on the inner side surrounded by said zone, said central portion having also a finished optical surface of different curvature than the outer zone surrounding it, said central portion having an optical power and the axis of said bow member passing through the center of said central portion.

8. A blank for an ophthalmic lens comprising a bowl shaped member of glass, said member having on its outer surface an outer annular zone finished to an optical surface and a central axial portion surrounded by said zone, said central portion being finished to an optical surface of different curvature than the surrounding zone and said member having on its inner surface an outer annular zone finished to an optical surface and the optical power through said outer zone portion being substantially zero, and a central axial portion on the inner side surrounded by said zone, said central portion having also a finished optical surface of different curvature than the outer zone surrounding it, said central portion having an optical power, and the axis of said bowl member passing through the center of said central portion.

ANNA E. GLANCY.